United States Patent [19]

DeCosta et al.

[11] 4,355,202

[45] Oct. 19, 1982

[54] MOUNTING ARRANGEMENT FOR A POSITION LOCATING SYSTEM

[75] Inventors: John DeCosta, Jackson; James B. Mallos, Freehold; David B. Roe, Lincroft, all of N.J.

[73] Assignee: Bell Telephone Laboratories, Incorporated, Murray Hill, N.J.

[21] Appl. No.: 214,173

[22] Filed: Dec. 8, 1980

[51] Int. Cl.³ .................. G08C 21/00; G01G 3/14; H04N 1/00

[52] U.S. Cl. .................................................. 178/18

[58] Field of Search ....... 177/210 R, 210 C, 210 EM, 177/210 FP, 211, 212, 3, 185, DIG. 3; 73/141 R, 141 A, 172, 763, 765, 767, 769, 770, 772, 777, 781, DIG. 4; 178/18, 19, 20; 340/146.35 Y, 709, 712; 33/1 M

[56] References Cited

U.S. PATENT DOCUMENTS 3,657,475 4/1972 Peronneau et al. ............... 178/18
4,121,049 10/1978 Roeber .............................. 178/18

OTHER PUBLICATIONS

"One-Point Touch Input of Vector Information for Computer Displays", Herot, *Computer Graphics* for Aug. 1978, pp. 210–216.
"Pressure Controlled Resistance Matrix", Einolf et al., IBM Tech. Dis. Bull., vol. 6, No. 3, Aug. 1963, pp. 4–5.

*Primary Examiner*—Thomas A. Robinson
*Attorney, Agent, or Firm*—H. L. Newman

[57] ABSTRACT

Mechanical coupling apparatus for a position locating system comprises a force sensing device (504). One extremity of the coupling apparatus is joined to a rigid body (506) which may be fixed. A plate or a visual display screen (501) having a surface (501a or 501b) exposed to the application of a localized force is joined to the other extremity of the coupling apparatus. The force sensing device senses force changes which are proportionately related to the localized force (F) applied to the exposed surface of the plate or visual display screen. The force is sensed through a predetermined point of action (510) of the coupling apparatus. In order to decrease error, the point of action (510) is in substantially the same plane as the exposed surface of the plate or screen. The coupling apparatus provides support to the plate or screen (501) without creating any undesirable moments.

21 Claims, 14 Drawing Figures

MOUNTING ARRANGEMENT FOR A POSITION LOCATING SYSTEM

CROSS-REFERENCE TO RELATED APPLICATION

A patent application entitled "Dynamic Position Locating System," Ser. No. 214,174, has been filed concurrently herewith by J. DeCosta, J. B. Mallos, and D. B. Roe.

BACKGROUND OF THE INVENTION

1. Technical Field

This invention relates to apparatus for locating the position of a localized force applied to the surface of a visual display and, more particularly, to apparatus for mounting the visual display.

2. Description of the Prior Art

From the earliest days of interactive computer use, a need has been felt to visually communicate with a computer in a direct, efficient manner. In the desired mode of operation, a computer terminal having a visual display presents to the user a plurality of alternative choices on the display. The user selects one desired alternative by simply touching the display at a location corresponding to the desired alternative. The computer terminal then reacts to the force of the touch by identifying that the touch has occurred at the identical location of the selected alternative presented on the display. The terminal may then perform according to the choice made by its user. While the basic goal is simply stated, it will be seen that a practical solution is dependent on the analysis and solution of several problems inherent in prior art position locating systems.

Peronneau et al., U.S. Pat. No. 3,657,475, discloses a position indicating system comprising a rigid plate, a plurality of force sensing devices, and a processing unit. The user of the Peronneau system applies a localized force F from above the exposed surface of a touch plate P, the force having potentially non-perpendicular direction. Referring to FIG. 1, when the localized force F is applied to the surface of the plate P, the piezoelectric sensors, $C_1$–$C_4$, provide the processing unit S with electrical signals, $G_1$–$G_4$, which are proportional to the applied force F. The processing system calculates the coordinates $H_1$, $H_2$ of the location M of the localized force F touching the plate. Equations from the laws of statics are employed, namely that the sum of the moments about an axis equals 0.

A considerable amount of error is introduced into the calculation of the coordinates of the point of touch in Peronneau. The error primarily arises from the Peronneau arrangement for mounting the plate between a force sensing device C and a rigid block D shown in FIG. 2. Because the planar surfaces of the force sensing devices $C_1$–$C_4$ are rigidly pinched to the surface of touch plate P by horseshoe spring E, each force sensing device exerts an undesirable moment or torque on plate P which adversely affects the measurements of the other force sensing devices. Also, because the Peronneau arrangement senses the applied force over the entire planar areas $A_1$–$A_4$ of each force sensing device, the length of the moment arm from point M to each force sensing device is not definite but runs to an undetermined point on the area of the force sensing device. Since the length of the moment arm is an important variable of the moment arm equation, the mathematical calculation of the coordinates of the point of application of the localized force is inherently inaccurate.

Another problem with the Peronneau mounting arrangement is that the points of force measurement are perpendicularly displaced from the plane of the exposed surface of the plate by a distance equal to the thickness of the plate P. Tangential components of the force F applied to the exposed surface of plate P produce moments which tend to act on the force sensing devices $C_1$–$C_4$ causing errors in the coordinate calculations.

Herot et al. in their publication "One-Point Touch Input of Vector Information for Computer Displays," *Computer Graphics*, v. 12, n. 3., pp. 210–216, disclose that they solve for these tangential components of the applied force and the torques they produce. They believe that it is useful to analyze the magnitude of the applied force and its direction.

Referring to FIG. 3, the Herot mounting arrangement comprises octagonally shaped spring members 301 which are used to mount a touch surface 302 to a display surface 303. Strain gauge sensors 304 are affixed to the spring members 301 to detect the magnitude and direction of the forces sensed when the members 301 are compressed and twisted.

A problem with the Herot mounting arrangement is that visual parallax error is introduced into the system because of the diameter of the octagonal members 301. The larger the diameter, the larger becomes the visual parallax error. The user in pointing to an item for identification on display surface 303 must perpendicularly point to the touch surface 302 or the visual parallax error will result. A further problem with the Herot system is that the system is susceptible to mechanical vibration caused by the flexible octagonal support members 301.

Roeber, U.S. Pat. No. 4,121,049, discloses a position and force measurement system whose mounting arrangement is shown in FIG. 4. The mounting arrangement comprises two similar rectangular rigid surfaces 401 and 404 whose edges are joined by semi-circular springs 402 upon which are mounted strain gauge sensors 403. The Roeber system minimizes tangential displacement by confining the movement of the upper touch surface 401 to the perpendicularly downward direction. The stresses detected by the sensors are proportional to the magnitude of the downward movement of surface 401 when a force is applied to it. Accordingly, the magnitude of the perpendicular force and the coordinates of its location may be calculated. However, the touch surface 401 must be displaced from the second surface 404 by the diameter of the semi-circular springs 402. Accordingly, visual parallax error results unless the user's line of sight is perpendicular to the point to be touched. Also, the accuracy of the Roeber system is necessarily limited by the variability of the spring constants of the semi-circular springs 402.

In light of the above, it is desired to provide a mounting arrangement whereby the coordinates of the location of the applied force may be simply and accurately calculated. At the same time, the visual parallax and other errors introduced by prior art mounting arrangements into the calculation of the coordinates should be eliminated.

SUMMARY OF THE INVENTION

The above-stated problems and relates problems of the prior art solved with the principles of the present mounting arrangement. The rigid body having the exposed touch surface to which the localized force is applied has an associated member for reducing the area of the force to a predetermined point of action, the point of action being a predetermined point of support about which that support exerts no moment. This may be accomplished in one embodiment of the present invention by forming this member as a pointed member or as a member for receiving the point of a pointed member. The unassociated member is then associated with the force sensing device. "Associated with," as used here and in the specification and claims, is defined to mean "either an integral part of or adapted to be joined to." A biasing spring holds the pointed member in registration with the receiving member, but it will be subsequently demonstrated that the calculation of the coordinates in this embodiment is independent of the spring constant of the biasing spring.

While the embodiment under discussion comprises a pointed member and a receiving member held in registration by a biasing spring, other embodiments may be employed having no biasing spring. In a similar manner to the embodiment under discussion, these embodiments provide support to the rigid body having the exposed touch surface such that no undesirable moments are created. An undesirable moment is a moment which a support exerts about itself.

In accordance with the principles of the present invention, the area of the force sensing device is effectively reduced to the predetermined point of action increasing the accuracy of the measurement of the location of the touch. Any undesirable moment exerted by the mounting arrangement is eliminated. Also, the lengths of the moment arms from the point of location of the applied force to the points of action of the applied force are definite.

Furthermore, it is desirable that the points of action be placed in the plane of the exposed touch surface. As a result, any applied force which is tangential to the touch surface will produce no torque about any axis in the plane of the points of action. In this manner, any change in the sensed force is simply a perpendicular component attributable to the applied force measured at the force sensing device.

The principles of the present invention may be employed in a variety of applications. One such application is the mounting of a touch plate to a second plate to form a portable system. A second application is the mounting of a touch plate to a display screen or cathode ray tube. A third application uses the cathode ray tube or display screen as the touch surface, the tube or screen being mounted to the structure for supporting the tube or screen using the principles of the present invention. In this latter embodiment, there is little or no visual parallax error because the plane of the touch surface is the plane of the viewing surface of the visual display.

In a system for selecting alternative choices by tapping a screen, the present mounting arrangement is preferable because of the improved accuracy of the location calculation and the elimination of visual parallax error and other errors introduced by prior art mounting arrangements. In a system for transmitting calligraphic data, an accurate representation of the calligraphic data may be reproduced by repeatedly calculating the location of the points of touch of a writing instrument to the touch surface.

DETAILED DESCRIPTION

Figure 1:
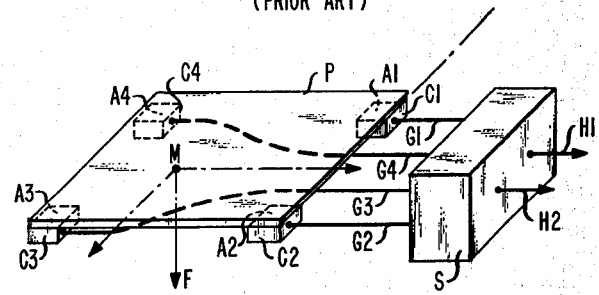
FIG. 1 is a view of the prior art position indicating system of Peronneau et al., disclosed in U.S. Pat. No. 3,657,475.
Figure 2:
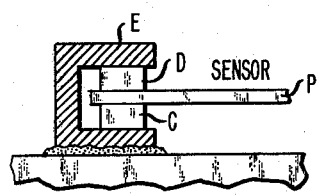
FIG. 2 presents the details of the prior art arrangement suggested by Peronneau for mounting a touch plate to a display screen.
Figure 3:
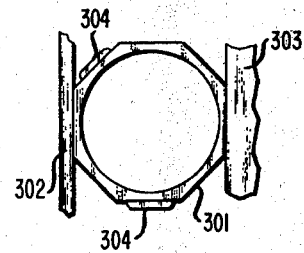
FIG. 3 presents the details of a prior art arrangement disclosed by Herot et al. in their publication entitled "One-Point Touch Input of Vector Information for Computer Displays," *Computer Graphics*, v. 12, n. 3, pp. 210–216, for mounting a touch plate to a cathode ray tube screen.
Figure 4:
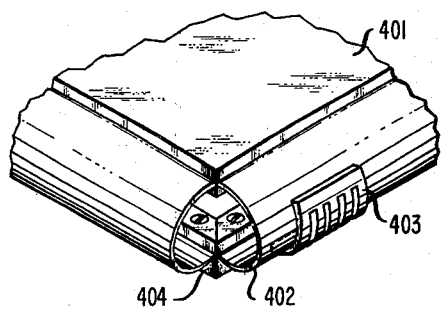
FIG. 4 presents the details of the prior art mounting arrangement suggest by Roeber, U.S. Pat. No. 4,121,049.
Figure 5:
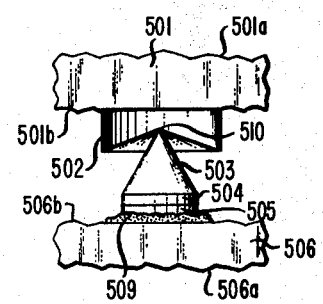
FIG. 5 presents one embodiment of the present mounting arrangement for a position locating system having a pointed member and a receptacle for the pointed member.

Referring to FIG. 5, a mounting arrangement for a position locating system in accordance with the principles of the present invention is shown which demonstrates how forces sensed by a force sensing device 504 may be reduced to a point. A rigid body 501 is mounted to a second rigid body 506 employing a pointed member 503 which is received by a member 502 which accommodates the point of member 503.

Rigid body 501 comprises an outer surface 501*a* or an inner surface 501*b* which may be exposed to the application of a localized force. Similarly, rigid body 506 may comprise an outer surface 506*a* or an inner surface 506*b* which may be exposed to the application of force. Whichever body 501 or 506 is exposed to the localized force, the other rigid body must be fixed in relation thereto in accordance with the principles of the present invention.

A force sensing device 504, which may most conveniently be a piezoelectric transducer in the form of a disc, is shown associated with the pointed member 503. In principle any force sensing device which does not deflect so greatly that it alters the geometry of the arrangement can be used to sense the reactions of the present arrangement to external forces. Alternative force sensing devices include, but are not limited to include, strain gauge sensors and variable capacitance transducers.

When a force is applied to the surfaces 501a, 501b or 506a, 506b of rigid bodies 501 or 506, the force sensed by force sensing device 504 is the force detected at the point of action 510. The force may be seen to be translated from point of action 510 directly to the force sensing device 504.

While FIG. 5 shows the force sensing device 504 as being associated with pointed member 503, the same translation will occur if the force sensing device is associated with receiving member 502. The force at point 510 will be similarly translated from point of action 510 directly to the force sensing device 504.

Completing the description of FIG. 5, a rigid member 505 is associated with the force sensing device 504. A rigid laminated structure is formed, the rigid laminated structure comprising pointed member 503, force sensing device 504, and member 505. It is believed that such a rigid, laminated structure may be prefabricated prior to assembly of a position locating system employing the structure. Accordingly, the structure is shown joined to rigid body 506 by solder, glue, or other form of joining substance 509. As previously mentioned, the principles of the present invention remain intact if member 503 is replaced with the receiving member 502 in forming the rigid laminated structure.

Also, in FIG. 5, pointed member 503 is shown in the form of a cone to conform to a disc-shaped force sensing device 504. In actuality, any pointed shape may be employed.

In the alternative, the force sensing device 504 may be associated with receiving member 502. Any shape of receiving member 502 may be employed so long as there is presented a suitable receptacle for accommodating the point of pointed member 503.

Figure 6:
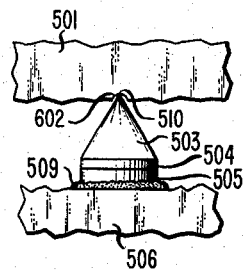
FIG. 6 presents an embodiment similar to the mounting arrangement of FIG. 5, demonstrating its inherent flexibility of application.

Referring to FIG. 6, similar reference characters are employed in order to carry this principle to its logical conclusion. Effectively, member 502 of FIG. 5 is shown to have been reduced in size to a small aperture-receptacle 602 of rigid body 501. The rigid laminated structure comprising elements 503, 504, and 505 is still able to translate the forces at point of action 510 to the force sensing device 504. In the alternative, if the rigid laminated structure were to comprise elements 502, 504, and 505, a rigid pointed bump on the surface of rigid body 501 will suffice to engage aperture-receptacle 602.

Figure 7:
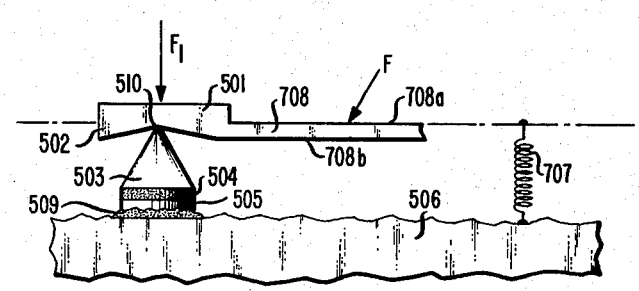
FIG. 7 presents how the embodiment of FIG. 5 is employed to mount a touch surface to a rigid body so that the plane of the touch surface includes the points of action of the applied force.

Referring now to FIG. 7, the embodiment of the mounting arrangement of FIG. 5 is again shown. This embodiment demonstrates how a touch force impinging on a touch surface is reduced to its perpendicular component at a point of action and the torque it causes eliminated. In addition to the mounting members shown in FIG. 5 is shown a touch plate 708 having an outer touch surface 708a (or in the alternative, an inner touch surface 708b) exposed to the application of a force F which may impinge on the surface 708a (or 708b) at any angle. It is assumed in FIG. 7 that there are other mounting arrangements strategically associated with touch plate 708 which assist in supporting touch plate 708.

A biasing spring 707 is shown which is employed to hold the receiving member 502 in engagement with pointed member 503. If $F_1$ is the force detected by force sensing device 504, then biasing spring 707 creates a steady state biasing force component of force $F_1$. Other steady state force components of force $F_1$ may include a component caused by the weight of the rigid body comprising plate 708 when plate 708 is not vertically oriented. As there is essentially no expansion or contraction of biasing spring 707, there can be no error introduced by a change in the spring tension of spring 707.

If the orientation or environment of the embodiment of FIG. 7 is changed, the steady state component of sensed force $F_1$ varies, as, for example, when the weight of the touch plate becomes a greater or lesser component of the sensed force $F_1$. This problem may be eliminated by constructing an alternating current coupling circuit which effectively eliminates the steady state component. Such an alternating current coupling circuit is more particularly described in the application entitled "Dynamic Position Locating System," Ser. No. 214,174, filed concurrently herewith.

Other alternative solutions to the problem include the use of a comparator amplifier to compare detected steady state values with expected values or the use of an appropriately designed processing system which automatically adapts to varying steady state components. The digital processing system stores measurements of $F_1$ when the system is stable in order to compare the stored values with an active measurement of force $F_1$ when a touch force F is applied. A system which may be used for this purpose is more particularly described in the cross-referenced related application filed concurrently herewith.

The features of the present mounting arrangement are provided by placing the point of action 510 in the same plane as the plane of the touch surface 708a. When a tangential force F is exerted on surface 708a, no moment can be exerted about point 510 because it is in the same plane as surface 708a. In other words, the point of action 510 is not displaced from the plane of force application; hence, there can be no torque created because the moment arm has zero length. Thus, the tangential force does not enter the moment equation which is used to calculate touch position. Force sensing device 504 senses only a changing perpendicular component of the force F when force F is applied in addition to the steady state forces previously described.

Figure 8:
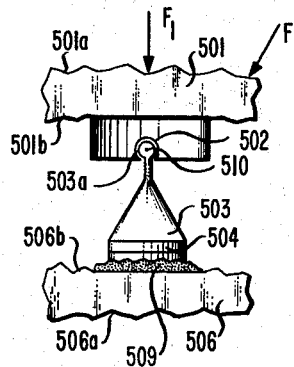
FIG. 8 presents an alternative embodiment of the present invention in the form of a frictionless ball and socket joint.

Referring now to FIG. 8, the requirement for a biasing spring 707 may be eliminated by employing mounting apparatus comprising a ball member 503a and a socket member 502. The ball and socket joint is lubricated so as to be practically frictionless. The lubrication should provide a continuum of contact between points on the surface of the ball 503a and points on the surface of the socket 502. The point of action 510 is the center of ball member 503a. Forces impinging on surfaces 501a or 501b of rigid body 501 or alternatively on surfaces 506a or 506b of rigid body 506 may be translated to force sensing device 504 in a similar manner to the mounting arrangement of FIG. 5. Also similar to the embodiment of FIG. 5, the force sensing device may be associated with the receiving element comprising socket 502 without violating the principles of the present invention.

Figure 9:
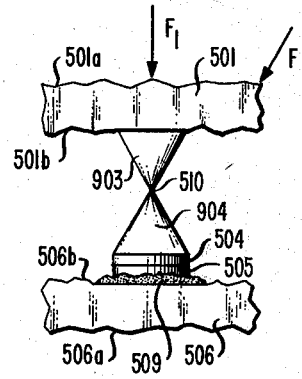
FIG. 9 presents an alternative embodiment of the present invention in the form of a flexible juncture of two conic members at their points.

Referring to FIG. 9, apparatus similar in concept to FIG. 8 is represented in that no biasing spring 707 is required. In this embodiment of the present invention, two conic members 903 and 904 are depicted being flexibly joined at their points. The point of action 510 of this embodiment is the point of juncture of the conic members 903 and 904.

All the embodiments thus far presented share the following aspects in common. Firstly, they are associated with the first and second rigid bodies 501 and 506. Secondly, they are also associated with a force sensing device 504. Thirdly, they are capable of supporting that rigid body, whether it be the first or second rigid body, which is exposed to the application of the localized force F. Fourthly, there is associated with all of them a predetermined point of action 510 about which no spurious moments can be created. Lastly, the force sensing device associated with each arrangement detects a perpendicular component force $F_1$ which includes a reactionary component of the applied localized force F at the predetermined point of action 510.

Figure 10:
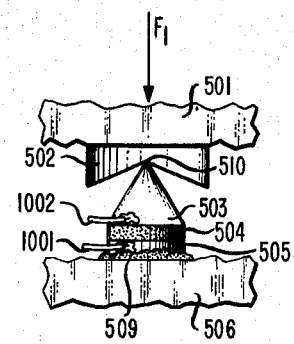
FIG. 10 presents an embodiment of the mounting arrangement of FIG. 5 in particular detail demonstrating how electrical access to the force sensing device may be achieved.

Referring now to FIG. 10, it is assumed that some form of electrical access is required to force sensing device 504. In this event, force sensing device 504 may be a thin ceramic disc-shaped piezoelectric transducer. In one embodiment constructed by the inventors, the disc 504 is 0.25 inch in diameter and 0.035 inch in thickness. The disc comprises lead zirconate titanate manufactured by Linden Laboratories and is known in the trade as Linden Laboratories material 101. The disc is poled in the axial direction and is always mounted such that the touch force is parallel to the axis of the disc.

While the arrangement depicted in FIG. 10 is similar to that of FIG. 5, the manner of providing electrical access may be universally applied to other mounting arrangements including those depicted in FIGS. 8 and 9.

Members 503 and 505 of FIG. 10 may comprise any form of rigid conducting material. In one embodiment the members 503 and 505 are constructed of brass. In this embodiment, force sensing device 504 is cemented to members 503 and 505 with conductive epoxy.

Force sensing device 504 converts forces to voltages which are proportional to the forces. Accordingly, in one embodiment constructed by the inventors, electrical access leads 1001 and 1002 are soldered to members 505 and 503 in order to detect the electrical voltages due to the force $F_1$ at sensing device 504.

Figure 11:
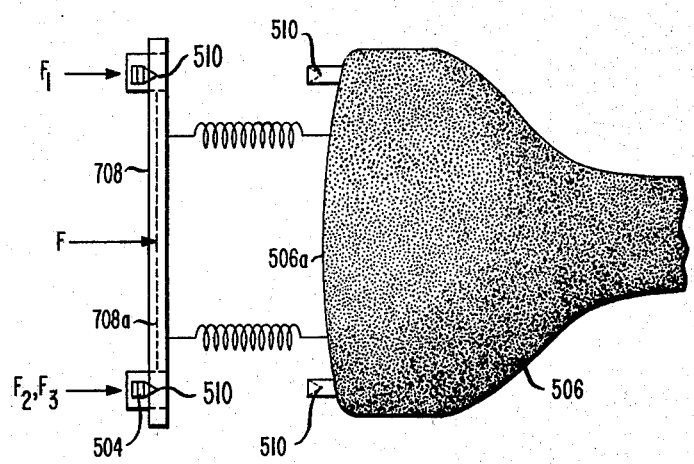
FIG. 11 presents a partially exploded side view of how the principles of the present invention may be employed to mount a touch plate to a display screen or cathode ray tube.

FIG. 11 presents a side view of how the principles of the present invention may be employed to mount a touch plate 708 to a rigidly mounted display screen or cathode ray tube 506. Where in FIG. 7 force sensing member 504 is shown associated with rigid body 506, in FIG. 11 the force sensing member 504 is associated with the body having the touch surface 708a. All points of action 510 should be in the same plane as the exposed surface 708a of the touch plate 708. However, in the embodiment of FIG. 11, some amount of visual parallax error is present as there must be some displacement of the touch surface 708a from the viewing surface 506a.

Figure 12:
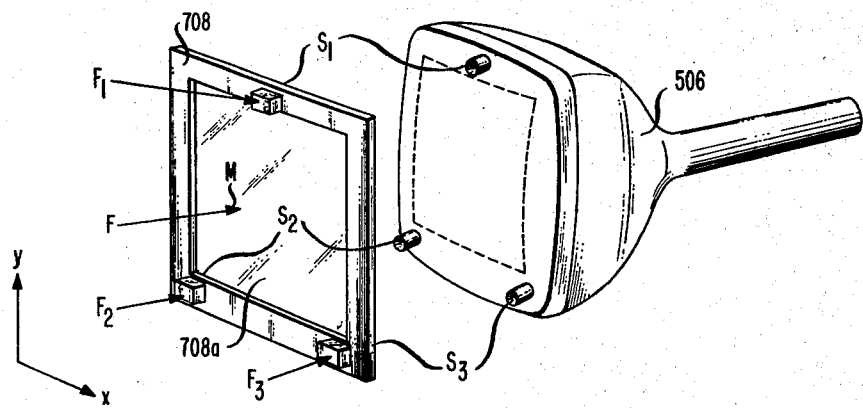
FIG. 12 presents an exploded perspective view of the apparatus of FIG. 11 demonstrating an isosceles triangular placement of the mounting arrangements.

FIG. 12 presents a perspective view of how the mounting arrangements should be placed to mount the touch plate 708 to the display screen or cathode ray tube screen 506. This view demonstrates the location of three mounting arrangements $S_1$, $S_2$, and $S_3$ in the form of an isosceles triangle. The isosceles triangular support depicted is preferred over other triangular arrangements such as a right triangular arrangement because the free corners of the screen receive better support. However all triangular arrangements present mechanical problems created by the unsupported cantilevered corners of a rectangular touch plate 708. These arrangements will not be practical unless the touch plate is quite rigid. Accordingly, a rectangular geometry of four force sensing arrangements may be used with a rectangular touch plate, the four force sensing arrangements being positioned at the four corners of the rectangle.

In order to determine the X and Y coordinates of the point of application M of applied force F the moment arm equation from the laws of statics is employed, namely, that the sum of the moments about an axis equals zero. The change in force $F_1$ detected at arrangement $S_1$ caused by force F may be defined as reaction force $R_1$. Similarly, the change in forces $F_2$ and $F_3$ detected at arrangements $S_2$ and $S_3$ respectively may be defined as reaction forces $R_2$ and $R_3$. The coordinates of the point of action of arrangement $S_1$ may be defined as $X_1$, $Y_1$; for $S_2$, the coordinates may be defined as $X_2$, $Y_2$; and for $S_3$, as $X_3$, $Y_3$. If a plurality of arrangements is employed, the nth arrangement $S_n$ shall be defined as recording reaction force $R_n$ at coordinates $X_n$, $Y_n$. Then, the following general equations are solved to calculate point of application M of applied force F:

$$X = \frac{\sum_{i=1}^{n} R_i X_i}{\sum_{i=1}^{n} R_i}$$

$$Y = \frac{\sum_{i=1}^{n} R_i Y_i}{\sum_{i=1}^{n} R_i}$$

Figure 13:
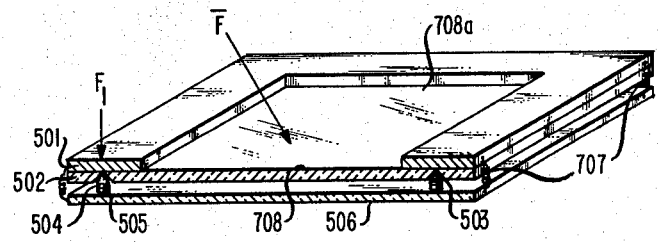
FIG. 13 presents a view of how the embodiment of FIG. 7 may be employed to construct a portable touch sensitive system.

Referring to FIG. 13, a portable touch plate system is shown having rectangularly placed mounting arrangements in accordance with the principles of the present invention. Since the touch plate surface 708a must remain free of visual impairment, the biasing springs 707 must be mounted outside of the viewing area. Also, since the viewing surface is located adjacent to rigid body 506, rigid body 506 must be transparent. A biasing spring 707 is placed at the location of each mounting arrangement.

The touch plate system of FIG. 13 has the advantage of portability. It may be attached to a television picture tube, a plasma panel display or a light emitting diode panel. All of these, of course, must have structures which complement the portable structure of FIG. 13 and which provide sufficient rigidity so that the portable structure may be attached and used to advantage. The structure of FIG. 13 has the disadvantage that visual parallax error will result from its use because the touch surface 708a will necessarily be displaced from the viewing surface of the visual display.

Figure 14:
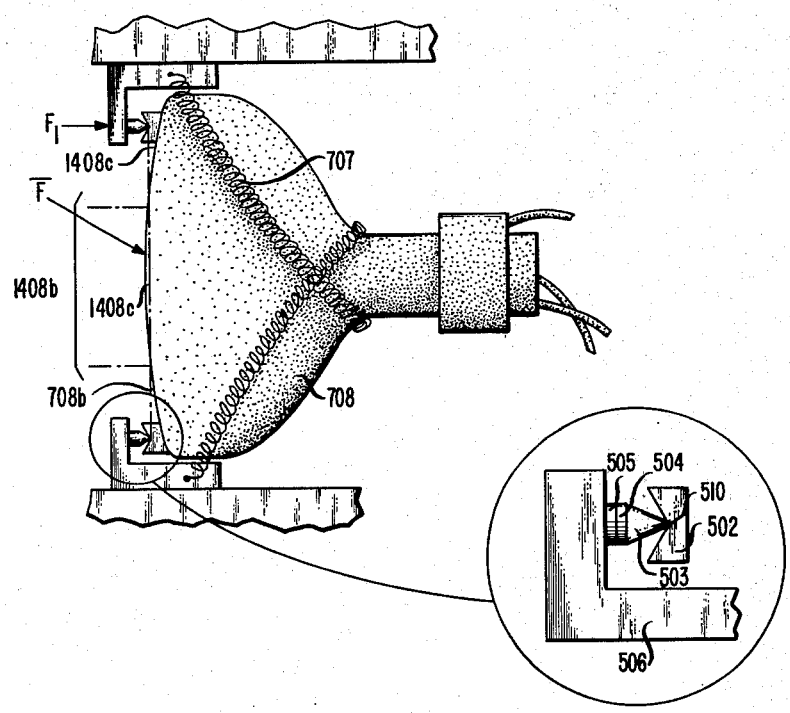
FIG. 14 presents a view of how the principles of the present invention may be employed to mount a cathode ray tube to its supporting structure so that the points of measurement of the applied force are in substantially the same plane as the curved viewing surface of the screen.

Referring to FIG. 14, the visual parallax errors that are present in the applications of the present mounting arrangement depicted in FIGS. 11, 12 and 13 are eliminated. Touch surface 708b is the viewing surface.

A different manner of force detection is employed in FIG. 14 than was employed in the previously discussed applications. While biasing springs 707 are still employed to hold pointed members 503 in engagement with their complementary receiving members 502, the difference lies in the presentation of component force changes to the force sensing devices 504. Where before a force impinging upon the outer touch surface 708a of a touch plate 708 tended to further compress or engage the pointed member 503 and its complementary receiving member 502, the biasing force is relieved in the embodiment of FIG. 14 and is directed at the inner surface 708b. A force directed at the inner touch surface 708b initially creates a negative change in the biasing force component sensed at each point of action 510. Accordingly, a sufficiently high force may physically displace the cathode ray tube screen 708 from its support structure 506. This problem may be simply corrected by increasing the tension of biasing springs 707 or by physically preventing such a magnitude of displacement by constructing a barrier or by using the embodiments of FIG. 8 or FIG. 9. To encourage the point of the pointed member to return to its original location, a lubricated or low friction material should be used to construct the receiving portion of element 502. This may also be accomplished by decreasing the vertex angle of the point of member 503 and the aperture of receiving member 502.

While the visual parallax problem is eliminated in the application depicted in FIG. 14, a problem arises if a cathode ray tube screen is employed as the viewing and touch surface. These screens typically have a slightly curved touch (and viewing) surface 708b. Accordingly, the points of action 510 may not practically be in the same plane as the points of touch. A cross-sectional area 1408b may be defined where the plane of the points of action 510 cuts the curved touch (and viewing) surface 708b. The number of touches outside this area 1408b should be expected to equal the number of touches inside the area 1408b. By an appropriate choice of area 1408b, the problems presented by the curved surface 708b may be minimized.

Of course, if another form of visual display is used which provides a flat viewing and touch surface, there is no calculating error or visual parallax error. Visual displays which may be applied to this end include flat, rigid rear projection screens; plasma panel displays; liquid crystal displays; or light emitting diode displays known commercially in the art.

In one embodiment constructed by the inventors, a 5-inch cathode ray tube screen is mounted to a rigid support structure by the mounting arrangement depicted in FIG. 14. The components for sampling and processing the impinging forces disclosed in the patent application filed concurrently herewith by J. DeCosta, J. B. Mallos, and D. B. Roe entitled "Dynamic Position Locating System," are used. The constructed embodiment achieves a standard deviation of about 3% or about 0.15 inch. It is important to point out, however, that a considerable portion of this error is caused by the inherent inadequacies of a cathode ray tube screen. Drift of the raster and distortion of the picture displayed are important contributors to the above-mentioned error factor.

We claim:

1. Apparatus for mechanically coupling a first rigid body (501) having a surface (501a or 501b) associated therewith which is exposed to the application of a localized force (F), a second rigid body (506), and a force sensing member (504) positioned between the first and second rigid bodies characterized in that the coupling apparatus is associated with the force sensing member (504) so that the force sensing member detects a perpendicular component force ($F_1$) comprising a perpendicular component of the applied localized force (F) at a predetermined point of action (510), the coupling apparatus providing support to the first rigid body (501).

2. Apparatus as presented in claim 1 further characterized by
a rigid, laminated structure comprising
a first layer consisting of a conducting material for providing a first means (801) of electrical access to the force sensing member (504),
a second layer comprising the force sensing member (504) and
a third layer comprising the coupling apparatus.

3. Apparatus for mechanically coupling a first rigid body (501) having a surface associated therewith which is exposed to the application of a localized force (F), a second rigid body (506), and a force sensing member (504) positioned between the first and second rigid bodies
characterized in that
the mechanical coupling is achieved such that the force sensing member (504) detects a component force ($F_1$) at a predetermined point of action (510) of a pointed element (503) with an element (502) of the first rigid body for receiving the point of the pointed element, the detected component force ($F_1$) comprising a perpendicular component of the localized force (F) applied to the exposed surface of the first rigid body which is urged toward the second rigid body by a biasing means (707).

4. In a touch sensitive position locating system, apparatus for mechanically coupling a first rigid body having a surface associated therewith which is exposed to the application of a localized force, a second rigid body, and a force sensing member positioned between the first and second rigid bodies
characterized by
a ball-shaped element (503a),
an element having a socket (502) for receiving the ball-shaped element,
either the ball-shaped element or the element having the socket being associated with the force sensing member (504) for detecting a perpendicular component force ($F_1$) comprising a perpendicular component of the applied localized force (F) at a predetermined point of action (510),
the coupling apparatus providing support to the first rigid body (501).

5. In a touch sensitive position locating system, apparatus for mechanically coupling a first rigid body having a surface associated therewith which is exposed to the application of a localized force, a second rigid body which is fixed in relation to the first rigid body, and a force sensing member positioned between the first and second rigid bodies
characterized by
two cone-shaped elements (903 and 904), joined at their points so as to form a flexible hinge,
either one or the other cone-shaped element being associated with the force sensing member (504) for detecting a perpendicular component force ($F_1$) comprising a perpendicular component of the applied localized force (F) at a predetermined point of action (510), the point of juncture of the two cone-shaped elements, the coupling apparatus providing support to the first rigid body (501).

6. Apparatus for mechanically coupling a first rigid body having a surface exposed to the application of a localized force, a second rigid body, and a force sensing member positioned between the first and second rigid bodies, characterized in that
the apparatus comprises:
a pointed element (503),
an element (502) for receiving the point of the pointed element, and
a biasing means (707) for maintaining the pointed element in engagement with the receiving element,
either the pointed element, or the receiving element being associated with the force sensing member (504),
the force sensing member detecting a component force ($F_1$) at a predetermined point of action (510) of the pointed element and the receiving element, the detected component force ($F_1$) comprising a perpendicular component of the localized force (F) applied to the exposed surface of the first rigid body.

7. Apparatus for mechanically coupling a first rigid body having a surface associated therewith which is subject to the application of a localized force, a force sensing member and a second rigid body, the force sensing member being positioned between the first and second rigid bodies;

characterized in that
the apparatus comprises:
a pointed element (503);
a receiving element (502) for accommodating the point of the pointed element;
biasing means (707) for maintaining the pointed element in engagement with the receiving element;
the force sensing member (504) being joined to one of the elements and adapted to be positioned between the element to which it is joined and either the first or the second rigid body, the other of the elements being associated with the other rigid body;
the application of a force (F) to the surface associated with the first rigid body resulting in the force sensing member (504) detecting a change in the component force ($F_1$) at the point of action (510) of the pointed element and the receiving element, the change (R) in the component force detected being a perpendicular component of the applied forced (F).

8. Apparatus as presented in claims 1, 3, 4, 5, or 6 further characterized in that in order to prevent error,
the predetermined point of action (510) is substantially in the same plane as the exposed surface of the first rigid body.

9. Apparatus for mechanically coupling a first rigid body having a surface associated therewith which is exposed to the application of a localized force, a plurality of force sensing members, and a second rigid body, characterized in that
the coupling apparatus is associated with each force sensing member (504) such that each force sensing member (504) detects a perpendicular component force ($F_1$) comprising a perpendicular component of the applied localized force (F) at a predetermined point of action (510), the coupling apparatus providing support to the first rigid body (501).

10. Apparatus for mechanically coupling a first rigid body having a surface associated therewith which is subject to the application of a localized force, a plurality of force sensing members and a second rigid body, characterized in that
associated with each force sensing member is either
a pointed element (503) or
an element (502) for receiving the point of the pointed element,
the force sensing member (504) and the associated element forming a rigid, laminated structure adapted to be positioned between the first and second rigid bodies, the first rigid body being urged toward the second rigid body by a biasing means (707) for maintaining the pointed element individually in engagement with its complementary receiving element.

11. Apparatus as presented in claim 10 further characterized in that the rigid, laminated structure comprises:
a first layer comprising the associated element consisting of a conducting material for providing a first means of electrical access (1001) to the force sensing member (504)
a second layer comprising the force sensing member and
a third layer consisting of a conducting material for providing a second means of electrical access (1002) to the force sensing member.

12. Apparatus for mechanically coupling a first rigid body having a surface associated therewith which is subject to the application of a localized force, a plurality of force sensing members, and a second rigid body, the force sensing members being positioned between the first and second rigid bodies characterized in that
associated with each force sensing member is either
a pointed element (503) or
a receiving element (502) for accommodating the point of the pointed element,
the other element being associated with either the first or the second rigid bodies;
the application of a force (F) to the surface associated with the first rigid body resulting in the force sensing member detecting a change in the ($F_1$) component force at the point of action (510) of each pointed element (503) and complementary receiving element (502), the component force detected ($F_1$) comprising a perpendicular component of the applied force (F).

13. Apparatus as presented in claims 9 or 12 further characterized in that the predetermined points of action (510) are in substantially the same plane as the exposed surface of the first rigid body.

14. Apparatus for mechanically coupling a first rigid body having a surface associated therewith which is exposed to the application of a localized force, a force sensing member and a second rigid body, the force sensing member being positioned between the first and second rigid bodies
characterized in that
the apparatus comprises:
A. a rigid laminated structure associated with either the first or second rigid body comprising a first layer (505) consisting of a conducting material for providing a first means of electrical access (1001) to the force sensing member (504), a second layer (504) comprising the force sensing member, and a third layer (503) comprising either a pointed element or an element for receiving the pointed element consisting of a conducting material for providing a second means of electrical access (1002) to the force sensing member and B. the other element which is associated with the other rigid body, the rigid, laminated structure and the other element being held in engagement between the first and second rigid bodies by a biasing means (707).

15. Apparatus for mounting a visual display to its supporting structure, the visual display having a surface associated therewith which is exposed to the application of a localized force and upon which surface may be presented a visual image and the mounting apparatus comprising a plurality of force sensing members positioned between the visual display and the supporting structure characterized in that the mounting apparatus is associated with each force sensing member (504) such that each force sensing member (504) detects a perpendicular component force ($F_1$) comprising a perpendicular component of the applied localized force (F) at a predetermined point of action (510), the mounting apparatus providing support to the visual display.

16. Mounting apparatus as presented in claim 15 further characterized in that the predetermined points of action (510) are in substantially the same plane as the exposed surface of the visual display.

17. A touch-sensitive position locating system comprising arrangements for mechanically coupling a first rigid body, having a surface associated therewith which is exposed to the application of a localized force, a second rigid body, and a plurality of force sensing members positioned between the first and second rigid bodies characterized by coupling apparatus, associated with each force sensing member (504) and adapted to provide support to the first rigid body, the force sensing members detecting a perpendicular component force ($F_1$) comprising a perpendicular component of the applied localized force (F) at a predetermined point of action (510) of the coupling apparatus, the predetermined point of action being in the same plane as the surface (708a) exposed to the application of the localized force (F), the touch surface (708a) being transparent so that a visual image may be seen therethrough, and the second rigid body (506) adapted to be attached to a rigid visual display so that the combination is fixed in relation to the first rigid body.

18. A touch-sensitive position locating system comprising an arrangement for mechanically coupling a rigid visual display having a surface associated therewith which is exposed to the application of a localized force, a rigid structure which is fixed in relation to the rigid visual display, and a plurality of force sensing members positioned between the rigid visual display and the fixed rigid structure characterized in that the surface (708a) of the rigid visual display (708) which is exposed to the application of the localized force (F) is the viewing surface of the rigid visual display (708).

19. A touch-sensitive position locating system as recited in claim 18 further characterized in that associated with each force sensing member (504) is coupling apparatus adapted to provide support to the rigid visual display (708), each force sensing member detecting a perpendicular component of the applied localized force (F) at a predetermined point of action (510) of the coupling apparatus.

20. A touch-sensitive position locating system as recited in claim 19 further characterized in that the point of action (510) of each coupling apparatus is in the same plane as the viewing surface (708a) except that, should the viewing surface be curved, the plane of the points of action is adapted to cut the curved viewing surface defining a viewing area (1408b), within which area the probability of a localized force (F) impinging thereupon is approximately equal to the probability of a localized force impinging outside the area.

21. A touch-sensitive position locating system for calculating the coordinates of the point of application of a localized force presented to an exposed surface of the system characterized by a cathode ray tube having a viewing surface (708b) which is exposed to the application of the localized force (F), and at least three coupling arrangements (502, 503, and 505), each comprising a force sensing member (504) for detecting a perpendicular component force ($F_1$) comprising a perpendicular component of the applied localized force (F) at a predetermined point of action (510) of the coupling arrangment, the predetermined points of action of all coupling arrangements being in substantially the same plane as the viewing surface of the cathode ray tube screen and the coupling arrangements providing support to the cathode ray tube.

* * * * *